United States Patent [19]
Becker

[11] Patent Number: 5,737,165
[45] Date of Patent: Apr. 7, 1998

[54] APPARATUS FOR DATABUS FAULT ISOLATION

[75] Inventor: Barry E. Becker, Smithtown, N.Y.

[73] Assignee: ILC Data Device Corporation, Bohemia, N.Y.

[21] Appl. No.: 598,357

[22] Filed: Feb. 8, 1996

[51] Int. Cl.$^6$ ......................................... H02H 9/00
[52] U.S. Cl. ................................. 361/58; 361/88
[58] Field of Search ........................ 361/35, 18, 58, 361/54, 55, 56, 78, 86, 88, 90–92

[56] References Cited

U.S. PATENT DOCUMENTS 5,155,648  10/1992  Gauthier ............................. 361/58
5,198,957  3/1993   Welty et al. ........................ 361/58

Primary Examiner—Jeffrey A. Gaffin
Assistant Examiner—Sally C. Medley
Attorney, Agent, or Firm—Louis Weinstein

[57] ABSTRACT

Apparatus for replacing conventional fault isolation resistors includes a terminal coupled to one winding of a transformer whose other winding is coupled across the two-line databus. Enhancement-mode-field-effect transistors have their source and drain electrodes each coupled between one end of the other winding and one of the databus lines and their control electrodes coupled at spaced intervals along the other winding. The winding voltage is zero when a terminal is not transmitting, turning off the field-effect transistors, presenting an open circuit. The parasitic body diodes of the transistors are connected in series and are poled to oppose each other to prevent conduction of signals from the databus. Thus, signals on the databus are not loaded by the terminal's output impedance. When winding voltage exceeds a threshold, one transistor conducts, providing substantially a short-circuit. The parasitic body diode of the remaining transistor also conducts. When the winding voltage reverses, the conductive states of the transistors are reversed. When the databus is coupled to a receiver by a separate transformer, fault isolation resistors protect the receiver path. When the transmitter and receiver use a common path between the databus and the terminal, higher resistance value fault isolation resistors are placed in parallel with each field-effect transistor, reducing reflections in the databus in the event of a fault. The transistors are preferably enhancement-mode MOSEFTs of either the N-channel or P-channel type; although bipolar transistors or insulated gate bipolar transistors may be employed.

24 Claims, 3 Drawing Sheets

APPARATUS FOR DATABUS FAULT ISOLATION

FIELD OF THE INVENTION

The present invention relates to providing fault isolation between a databus and a terminal and more particularly to novel transistor means coupled between the terminal and the databus to provide superior fault isolation between the terminal and the databus as compared with the use of conventional techniques and to provide significantly reduced signal loss as compared with conventional techniques when the terminal is transmitting to the databus.

BACKGROUND OF THE INVENTION

Multi-subscriber databuses generally require some method for isolating the databus from faults occurring at a subscriber's terminal. For example, in MIL-STD-1553 which is a military databus standard, it is specified that fault isolation resistors must be employed between the databus and every terminal connected to the databus to provide adequate protection for the databus from faults.

Two cases exist for MIL-STD-1553, namely, the "direct coupled" case and the "transformer coupled" case. Both of these cases are illustrated in FIG. 1, wherein databus 10, which is comprised of a twisted pair of lines, is directly coupled to terminal 12 and is transformer coupled to terminal 14. In the direct-coupled arrangement, terminal 12 is coupled to databus 10 through transformer T1, winding W1 being coupled to terminal 12 and winding W2 being coupled to databus 10 through fault isolation resistors R.

In the transformer-coupled arrangement, terminal 14 is coupled to databus 10 through first transformer T2 and second transformer T3, winding W1 of T2 being coupled to terminal 14, winding W2 of T2 being coupled to winding W1 of T3 and winding W2 of T3 being coupled to databus 10 through the fault isolation resistors R, as shown.

In both cases, the fault isolation resistors R provide a known, non-zero impedance to the databus in the event of a short-circuit in the terminal or in any one of the transformers T1–T3. That impedance must be high enough to permit the databus to continue operation in the presence of a short-circuited terminal. In MIL-STD-1553, for example, the resistors R are each specified as having a value of 0.75×Zo where Zo is the characteristic impedance of the databus. Since the databus is terminated at both ends, the load presented to any databus subscriber is 0.5×Zo. The two fault isolation resistors add up to 1.5×Zo, so that the signal delivered to the databus is only 25% of the amplitude of the signal produced by the terminal's transmitter, due to the voltage division between 0.5×Zo and 1.5×Zo.

This loss in signal is a distinct disadvantage of using resistors for fault isolation. The transmitter must produce four times the signal amplitude actually delivered to the databus, three quarters of the power dissipated in the load being dissipated by the fault isolation resistors R. In addition, in the event of a fault, the 1.5×Zo load presented by a shorted terminal causes bus reflections on the order of 25% to any signals appearing on the bus. It is therefore advantageous to provide a circuit arrangement of relatively simple design and with as few components as is practical for reducing bus reflections and/or transmission power losses.

A reduction in the number of electrical and/or electronic components reduces the probability of failures.

BRIEF DESCRIPTION OF THE INVENTION

The present invention provides method and apparatus for substantially eliminating the disadvantages inherent in the use of fault isolation resistors employed in the circuit path between the transmitter and the databus and is characterized by comprising an arrangement in which the fault isolation resistors can be either totally eliminated or bypassed during a mode in which the terminal is transmitting to the databus and, even in cases where the fault isolation resistors are employed between the databus and the terminal's receiver, the resistance of the fault isolation resistors can be significantly higher, thereby producing much smaller reflections on the databus in the event of a short-circuit.

The technique of the present invention utilizes semiconductor devices arranged between the ends of a transformer winding coupled to the databus and the databus, which semiconductor devices have their polarities arranged to prevent conduction from the databus to the transmitter. When the transmitter is transmitting to the databus, the semiconductor devices are alternately rendered conductive according to the polarity of the voltage developed across the winding coupled to the semiconductor devices, to establish a conductive path of significantly reduced impedance which is no greater than 10% of the impedance of a conventional fault isolation resistor such that greater than 75% of the signal produced by the transmitter is delivered to the databus.

In a preferred embodiment, the semiconductor devices employed are enhancement-mode field effect transistors (MOSFETs).

In applications where the transmitter and receiver are separately and independently coupled to the databus, the receiver may utilize fault isolation resistors of a larger magnitude impedance to significantly reduce reflections on the databus in the event of a short circuit.

In applications wherein the terminal incorporates a transmitter and receiver coupled through a single, common path, fault isolation resistors of a higher impedance value may be coupled in parallel with each semiconductor device to provide a conductive path for signals being transmitted from the databus to the receiver, which significantly reduce reflections in the databus in the event of a short-circuit. During an operating mode in which a transmitter occupying a common path with the receiver is in the transmitting mode, the semiconductors bypass the fault isolation resistors and thus significantly reduce the power dissipation which is otherwise experienced when using conventional fault isolation resistors.

Although the preferred embodiment employs field effect transistors, other active semiconductor devices may be employed to achieve the results obtained with field effect transistors although requiring a larger number of discrete components. For example, the field effect transistors may be replaced by bipolar transistors or insulated gate bipolar transistors connected in a manner similar to the field effect transistors. When making such substitutions, it is thus necessary to provide additional discrete components such as diodes, resistors and the like, thereby increasing the total number of components required which increases the probability of a failure in the circuit.

OBJECTS OF THE INVENTION

It is therefore one object of the present invention to provide a method and apparatus for isolating faults from a databus utilizing active electronic devices.

Still another object of the present invention is to provide method and apparatus for isolating faults from a databus which substantially eliminates the need for conventional passive fault isolation electrical elements.

Still another object of the present invention is to provide novel active electronic means for providing fault isolation for a databus utilizing transistors.

Still another object of the present invention is to provide novel active electronic means for providing fault isolation for a databus utilizing bipolar transistors.

Still another object of the present invention is to provide novel active electronic means for providing fault isolation for a databus utilizing bipolar transistors wherein said bipolar transistors may be of the insulated gate type (IGBT).

Still another object of the present invention is to provide novel active electronic means for providing fault isolation for a databus utilizing field effect transistors.

Still another object of the present invention is to provide novel active means for providing fault isolation for a databus utilizing metal oxide semiconductor field effect transistors.

Still another object of the present invention is to provide novel active means for providing fault isolation for a databus utilizing enhancement-mode field effect transistors.

Still another object of the present invention is to provide novel active electronic means for providing fault isolation for a databus utilizing enhancement-mode MOS field effect transistors.

BRIEF DESCRIPTION OF THE FIGURES

The above, as well as other objects of the present invention will become apparent from reading the following description and drawings in which.

DETAILED DESCRIPTION OF THE INVENTION AND PREFERRED EMBODIMENTS THEREOF

Figure 2:
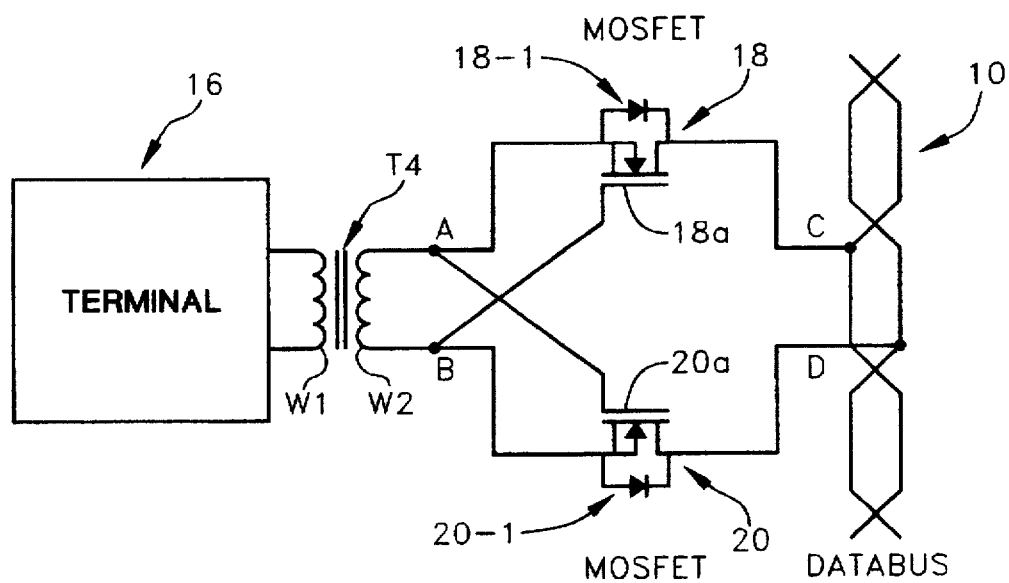
FIG. 2 is a schematic diagram showing one preferred embodiment of the present invention which eliminates the need for conventional fault isolation resistors.

FIG. 2 shows one preferred embodiment of the method and apparatus of the present invention in which a terminal 16 is coupled to winding W1 of transformer T4. A first active device, i.e. a semiconductor device 18 has an input and output terminal thereof coupled between one end terminal of winding W2 and one wire of the twisted two-wire pair comprising the databus 10, said connections being identified in FIG. 2 as being between terminals A and C.

A second semiconductor device 20 is coupled to the opposite end of winding W2 at B and to the remaining wire of the two-wire databus pair 10 at D.

Each active semiconductor device has a control electrode 18a, 20a.

The control electrodes are cross-coupled in the manner shown in FIG. 2 so that control electrode 18a is coupled to terminal B and control electrode 20a is coupled to terminal A.

In one preferred embodiment, the active semiconductor devices are field-effect-transistors (FETs) preferably of the metal-oxide-semiconductor type (i.e. MOSFETs) and preferably of the enhanced-mode type MOSFET. It should be understood that although MOS is an acronym for metal oxide semiconductor, field effect transistors presently in use are typically not made with metal gates insulated by metal oxide, but are actually made with silicon gates insulated with silicon dioxide and the use of the acronym MOSFET should be understood to be broadly interpreted herein as encompassing field effect transistors made in the traditional way as well as field effect transistors having silicon gates insulated by silicon dioxide.

FIG. 2 shows the devices 18 and 20 as each having parasitic body diodes 18-1 and 20-1, respectively. Diodes 18-1 and 20-1, which are effectively connected in series, through winding W2 are poled in opposite directions, preventing the conduction of signals on databus 10 to terminal 16 when the FETs 18 and 20 are not conducting. Signals appearing on the databus 10 are not loaded by the output impedance of terminal 16, even if the output impedance of terminal 16 is a short-circuit.

When terminal 16 is transmitting to databus 10, if terminal A is more positive than terminal B by a voltage exceeding the turn-on threshold of the device 20, device 20 which, for example, may be an N-channel FET, will be switched on, providing a very low resistance across the terminals of device 20, thereby effectively providing a short-circuit between terminals B and D. The parasitic body diode 18-1 of device 18 completes the conduction path between terminals A and C, since terminal A is more positive than terminal C. When the voltage of terminal B is more positive than the voltage of terminal A and exceeds the turn-on threshold of device 18, the devices 18 and 20 reverse roles, i.e. device 18 is rendered conductive and the parasitic body diode 20-1 of device 20 completes the conduction path between terminals B and D. This operation continues in a dynamic and automatic fashion.

The losses associated with this technique of fault isolation are reduced to one diode voltage drop (across the parasitic body diode) and the voltage drop across the "on" device. For example, when device 20 is conductive, the losses include the voltage drop across device 20 and the diode voltage drop of the parasitic body diode 18-1. This is typically no greater than 10% of the impedance of a conventional fault isolation resistor, whereby greater than 75% of the signal developed by the transmitter is delivered to the databus. In the preferred embodiment shown in FIG. 2, devices 18 and 20 are N-channel MOSFETs. It should be understood that either N-channel or P-channel devices may be employed. In the case where P-channel MOSFETs are employed, device 18 turns on when terminal A is more positive than terminal B and device 20 turns on when terminal B is more positive than terminal A, it being further understood that the voltage difference exceeds the turn-on threshold for the MOSFETs.

In applications where a transmitter and a receiver of a terminal respectively utilize separate transmitter and receiver paths i.e. wherein the receiver of the terminal has a separate transformer and separate bus connection, fault isolation resistors may be used in the receiver path to protect against the failure in the terminal's receiver or to protect against a failure or fault in the transformers associated with the path. For example, noting FIG. 4, terminal 16' is comprised of transmit and receive portions. The transmit path of terminal 16' is coupled to databus 10 by transformer T4 and MOSFETs 18 and 20 in a manner similar to that shown in FIG. 2. The receiver portion is coupled to databus 10 by a separate receive path comprised of transformer T5 and fault isolation resistors R. The transmit path shown in FIG. 4 operates in the same manner as the transmit path shown in FIG. 2.

The fault isolation resistors R employed in the receiving path have significantly higher resistances than the values specified by, for example, MIL-STD-1553, thereby producing significantly smaller reflections in the databus in the event of a short circuit in the receive path. For example, the resistance value of the fault isolation resistors employed in the embodiment of FIGS. 3 and 4 may be five (5) or more times greater than the resistance values of fault isolation resistors employed in conventional circuit designs, to provide a significant reduction in reflections on the databus in the event of a short-circuit.

Figure 3:
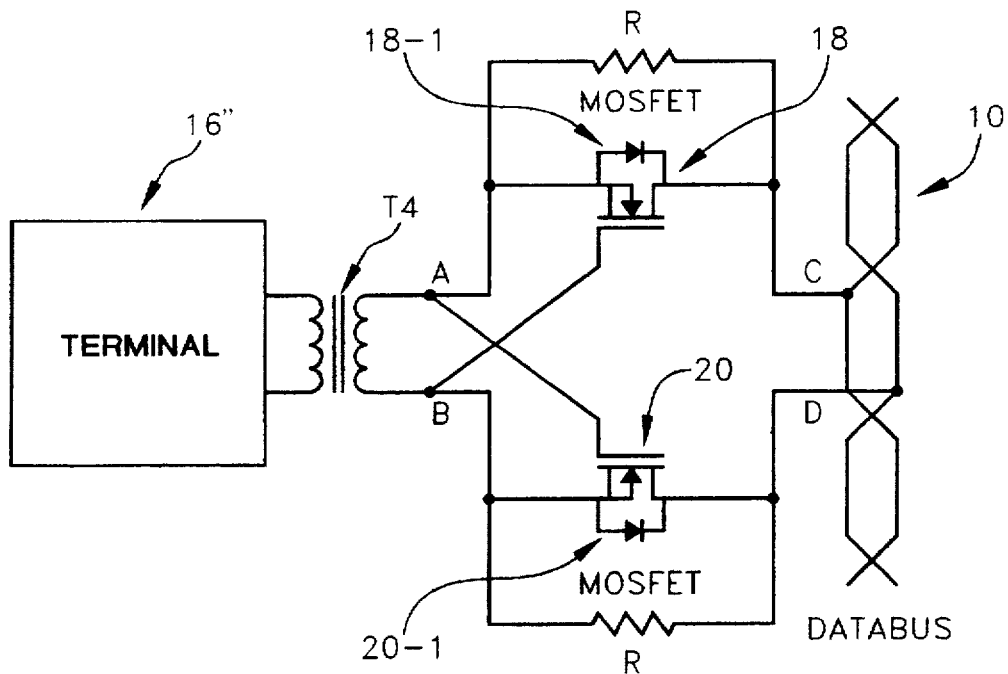
FIG. 3 is a schematic diagram showing still another embodiment of the present invention further incorporating fault isolation resistors for use in applications in which the transmitter and receiver of a terminal are coupled to a databus through a common path.

FIG. 3 shows an arrangement in which terminal 16" comprises a transmitter and receiver utilizing a common path between the databus 10 and terminal 16". In this arrangement, fault isolation resistors R are placed in parallel with each device 18, 20.

Figure 1:
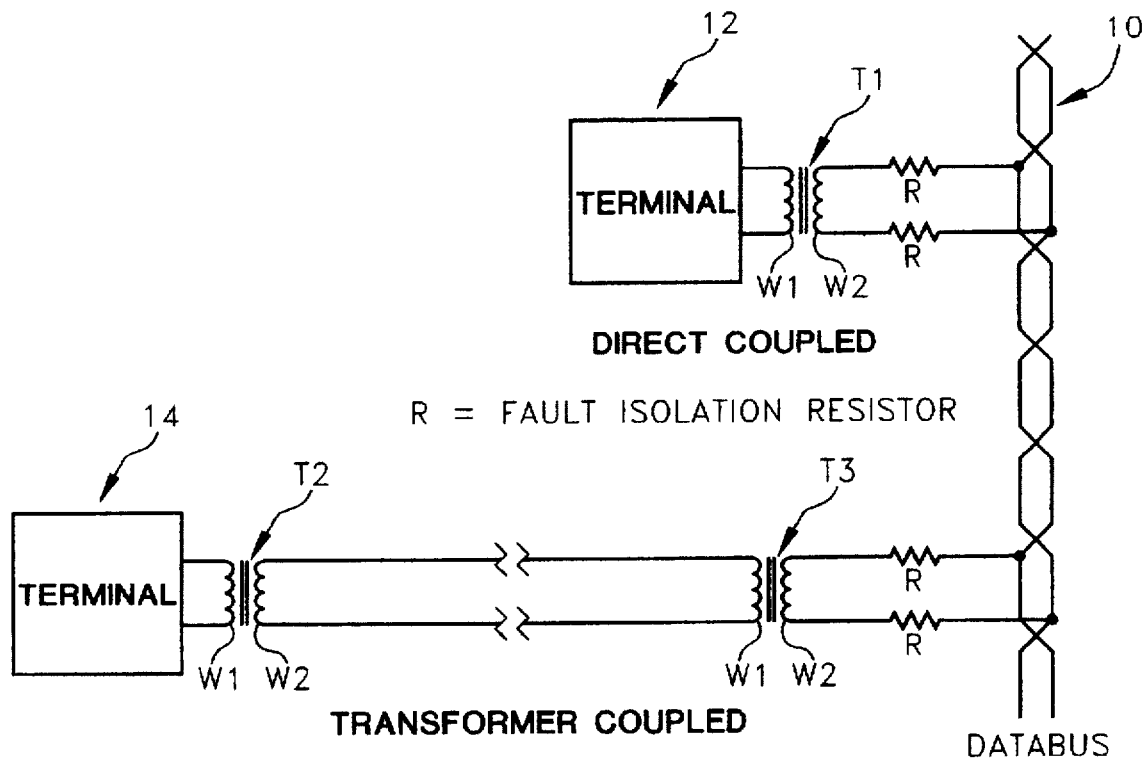
FIG. 1 is a schematic diagram showing a conventional arrangement for coupling terminals to a databus and which utilizes traditional fault isolation resistors.

In operation, when the transmitter is not operating and the databus 10 is transmitting to the receiver in terminal 16", the electrical path between databus 10 and terminal 16" is through the fault isolation resistors R. These fault isolation resistors may have resistance values which are five (5) or more times greater than the resistance values used in conventional circuits such as that shown in FIG. 1 to provide a path for signals transmitted from the databus to the receiver.

In operation, when the transmitter is operating, and assuming that terminal A is at higher voltage than terminal B, the voltage drop across device 20 creates substantially a short-circuit between terminals B and D which represents the conductive path therebetween. Device 18 has a very small voltage drop across its parasitic diode 18-1 which establishes the current path between terminals A and C. Thus, the power dissipation is significantly less than that of the standard circuitry employing conventional fault isolation resistors.

In an operating mode in which the transmitter of terminal 16" is turned off and the databus 10 is transmitting to the receiver provided in terminal 16", devices 18 and 20 act as open circuits so that the signals transmitted from databus 10 to the receiver of terminal 16" are directed through the fault isolation resistors R. The resistance value of the fault isolation resistors can be significantly greater than that employed in conventional fault isolation techniques, such as MIL-STD-1553 to produce significantly smaller reflections on the databus 10 in the event of a short circuit.

Although devices 18 and 20 in the preferred embodiment of the invention are preferably enhancement mode MOSFETs, it should be understood that any other active semiconductor devices having conductive diode paths of a low voltage drop when not conducting and having a conductive path of an effective short circuit when conducting or active semiconductor devices used in combination with diodes and capable of providing the functions described herein, may be employed.

Figure 5:
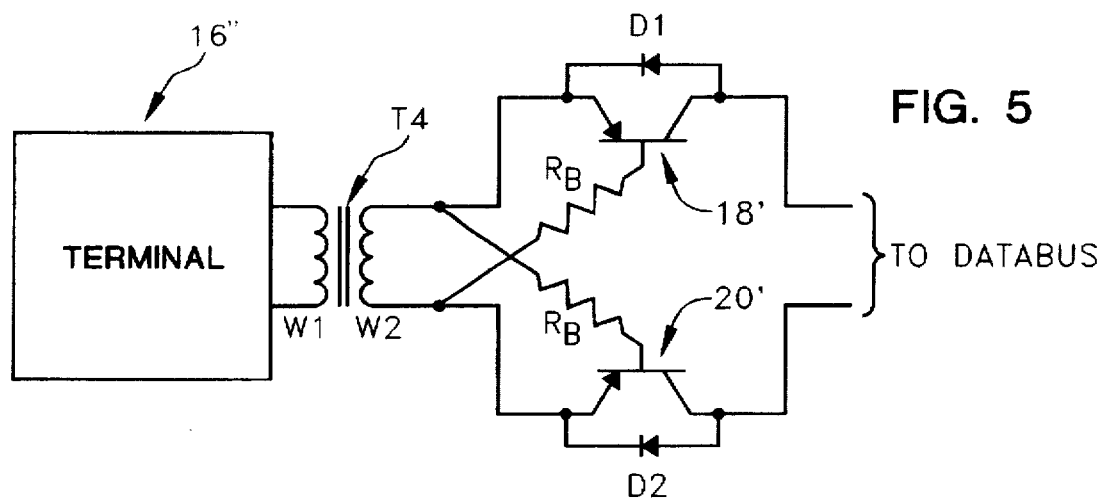

FIG. 5 shows another embodiment of the present invention employing bipolar transistors and discrete diodes. More specifically, terminal 16" is coupled to the databus through transformer T4. Bipolar transistor 18' has its emitter coupled to one end of winding W2 and its collector coupled to one line of the databus. Bipolar transistor 20' has its emitter coupled to the opposite end of winding W2 and its collector electrode to the other line of the two-line databus. The base electrode of transistor 18' is coupled to the lower end of winding W2 through a base resistor $R_b$. A similar cross-coupling is provided for the base electrode of transistor 20'. This arrangement operates in a manner similar to the embodiment shown in FIG. 2 whereby, when the voltage of sufficient amplitude and polarity is developed across winding W2 during transmission by transmitter 16", one of the bipolar transistors 18' and 20' conducts and the discrete diode coupled across the non-conducting transistor completes the circuit loop between terminal 16' and the databus. When the voltage polarity reverses across winding W2, the bipolar transistors reverse their conductive states. During conduction, the voltage drops comprise a substantial short circuit across the conducting transistor and a small voltage drop across the discrete diode coupled across the non-conducting transistor. When the terminal 16" is not transmitting, there is an effective open circuit across the databus.

Figure 6:
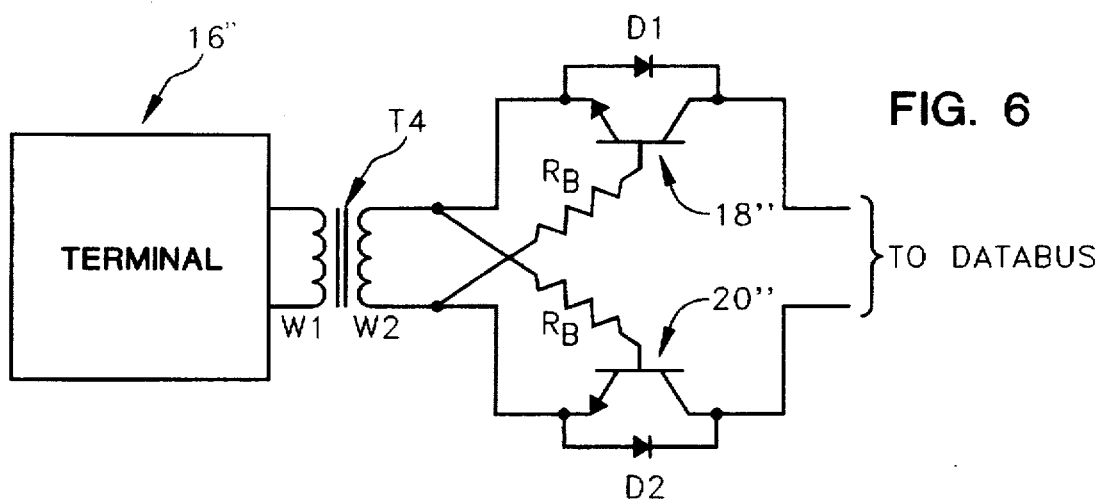

The embodiment of FIG. 6 differs from that of FIG. 5 in that the PNP bipolar transistors employed in FIG. 5 are replaced with NPN bipolar transistors. The operation of the embodiment shown in FIG. 6 is substantially the same as that shown in FIG. 5, namely, that when a voltage is developed across winding W2 to reach the threshold level of conduction, one of the transistors 18" or 20" conducts while the diode across the non-conducting transistor completes the circuit loop between the terminal and the databus. When the terminal 16" is not transmitting, the components 18", 20", D1 and D2 present an effective open circuit.

Figure 7:
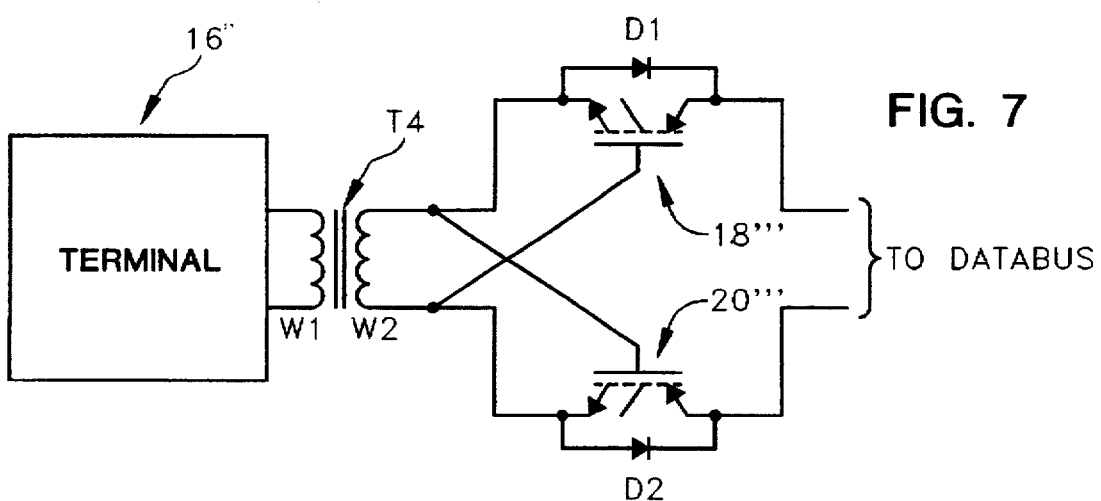

In the embodiment of FIG. 7, the bipolar transistors of FIGS. 5 and 6 are replaced by insulated gate bipolar transistors IGBTs 18''' and 20''' coupled in the manner shown in FIG. 7 and wherein the insulated gates of the transistors 18''' and 20''' are cross-coupled to opposing ends of winding W2. Discrete diodes D1 and D2 are coupled across the IGBTs 18''' and 20''' as shown.

The operation of the embodiment shown in FIG. 7 is substantially the same as that described hereinabove in that when a voltage developed across winding W2 reaches the conduction threshold of the IGBT, one of the transistors 18''' or 20''' conducts. The discrete diode across the non-conducting transistor completes the loop between terminal 16" and the databus. When the polarity of the voltage developed in winding W2 reverses, the conductive states of the transistors 18''' and 20''' likewise reverse. Thus, when terminal 16" is transmitting to the databus, the voltage drops between winding W2 and the databus comprise a substantial short-circuit across the conducting transistor and a small voltage drop across the discrete diode coupled across the non-conducting transistor. When terminal 16" is not transmitting, the circuitry of FIG. 7 presents effectively an open circuit to the databus.

Figure 4:
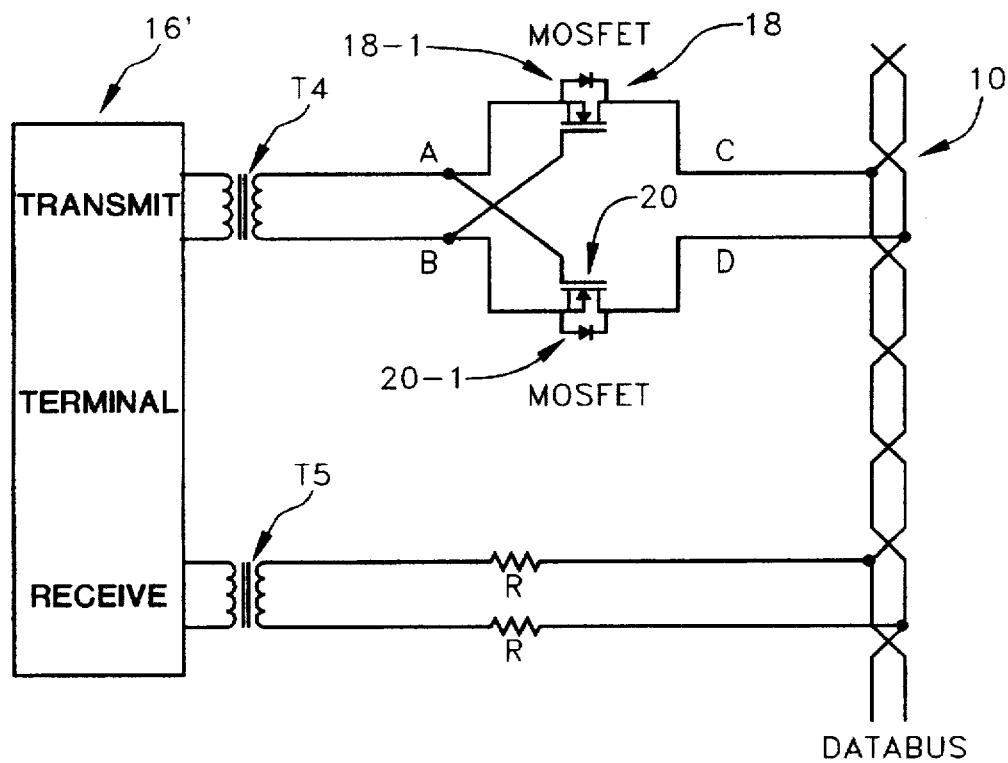
FIGS. 4 through 7 are schematic diagrams showing still further embodiment of the present invention.

Although the embodiments of FIGS. 5–7 substantially achieve the same objectives as the embodiments of FIGS. 2–4, the embodiments of FIGS. 5–7 require a significantly greater number of components than the embodiments of FIGS. 2–4. For example, the embodiments of FIGS. 5 and 6 require two transistors, two diodes and two resistors and the embodiment of FIG. 7 requires two transistors and two discrete diodes, whereas the embodiment of FIGS. 2–4 requires only two transistors and, by reducing the number of discrete components, the circuitry of FIGS. 2–4 significantly reduce the probability of failure.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Fault isolation means for use between a terminal and a databus and which eliminates the need for fault isolation resistors in a transmit path, comprising:

transformer means coupled between said terminal and said databus;

first and second active semiconductor means coupled between said databus and said transformer means; and said semiconductor means each having a control electrode, each control electrode being coupled to a winding of said transformer means whereby both of said semiconductor means are turned off when a voltage across said winding is below a threshold level and is thus insufficient to render the semiconductor means conductive to isolate said terminal from said databus and for selectively causing only one of the semiconductor means to conduct when the voltage across said winding is equal to or greater than said threshold level, thereby establishing a conductive path between said terminal and said databus, the voltage drop across a semiconductor means when conducting being significantly lower than a voltage drop developed across a fault isolation resistor typically employed to provide isolation between said terminal and said databus.

2. The apparatus of claim 1 wherein said semiconductor means are field effect transistors.

3. The apparatus of claim 2 wherein said field effect transistors are metal oxide semiconductor field effect transistors (MOSFETS).

4. The apparatus of claim 3 wherein said MOSFETS are of the enhancement-mode type, each having parasitic body diodes connected in series and having polarities opposing one another to present a high impedance to the databus when the MOSFETS are not conducting and to provide a small voltage drop across a conducting parasitic body diode of a MOSFET which is turned off and a short-circuit across a MOSFET which is conducting.

5. The apparatus of claim 2 wherein said field effect transistors are of the N-channel type.

6. The apparatus of claim 2 wherein said field effect transistors of the P-channel type.

7. The apparatus of claim 6 wherein said control electrodes comprise gate electrodes which are connected at spaced locations along said winding.

8. The apparatus of claim 2 wherein said field effect transistors each have a source and drain electrode, said source and drain electrodes being connected between one end of said winding and said databus.

9. The apparatus of claim 1 wherein said semiconductor means are transistors.

10. The apparatus of claim 9 wherein said transistors are PNP bipolar transistors.

11. The apparatus of claim 9 wherein said transistors are NPN bipolar transistors.

12. The apparatus of claim 9 wherein the transistors are insulated gate bipolar transistors.

13. The apparatus of claim 9 further comprising a diode coupled across each transistor, the polarity of the diodes being such that when one of said transistors conducts, the diode across a remaining one of the transistors completes a current loop between the terminal and the databus.

14. The apparatus of claim 9 wherein resistors are coupled to each control electrode.

15. The apparatus of claim 1 wherein said terminal includes transmitter and receiver means coupled to said databus through said transformer; and impedance means coupled in parallel across each of said semiconductor means to provide fault isolation protection for said databus in the event of a fault or short circuit in the transformer or receiver means.

16. The apparatus of claim 15 wherein said impedance means comprise resistors having resistance values selected to reduce reflections in the databus.

17. The apparatus of claim 16 wherein the resistance values of said resistors are greater than the resistance values of conventional fault isolation resistors used in systems in which the aforesaid semiconductor means are not employed.

18. The apparatus of claim 17 wherein the resistance values of said resistors are at least five (5) times greater than resistance values of conventional fault isolation resistors.

19. The apparatus of claim 15 wherein the accumulated voltage drops across the semiconductor means when the transmitter is operating is no greater than 10% of the voltage drop in systems employing conventional fault isolation resistors and in which the aforesaid semiconductor means are not employed.

20. The apparatus of claim 1 wherein said terminal is further comprised of a receiver;

a separate path for coupling said receiver to said databus comprising second transformer means;

impedance means coupled between said transformer means and said databus to provide fault isolation protection, said impedance means having resistance values selected which are greater than the resistance values of conventional fault isolation resistors to significantly reduce reflections on the bus in the presence of a fault.

21. The apparatus of claim 20 wherein the resistance values of said impedance means is at least five (5) times the resistance values of conventional fault isolation resistors.

22. The fault isolation means of claim 1 wherein the control electrodes are connected to opposing ends of said transformer winding and each of said first and second semiconductor means has a source coupled to an end of said winding opposite that end of said winding to which its control electrode is coupled.

23. A method for providing fault isolation between a terminal and a two-line databus which eliminates the need for conventional fault isolation resistors, an output of said terminal including a transformer, said method comprising:

providing essentially an open-circuit between said databus and said transformer when the terminal is not transmitting to the databus; and coupling the transformer to the databus through a first conductive path providing substantially a short-circuit between one end of a winding of the transformer and one line of the databus and providing a second conductive path having a small voltage drop between another end of said winding and another line of said databus when the terminal is transmitting to the databus.

24. A method for providing fault isolation between a terminal and a two-line databus which eliminates the need for conventional fault isolation resistors, an output of said terminal including a transformer, said method comprising:

providing a fault isolation impedance between said databus and said transformer when the terminal is not transmitting to the databus to provide fault protection for the databus; and coupling the transformer to the databus through a first conductive path providing substantially a short-circuit between one end of a winding of the transformer and one line of the databus and providing a second conductive path having a small voltage drop between another end of said winding and another line of said databus when the terminal is transmitting to the databus, said first and second conductive paths bypassing said impedance.

* * * * *

UNITED STATES PATENT AND TRADEMARK OFFICE
CERTIFICATE OF CORRECTION

PATENT NO. : 5,737,165
DATED      : April 7, 1998
INVENTOR(S): Becker

It is certified that error appears in the above-identified patent and that said Letters Patent is hereby corrected as shown below:

Col. 1, line 43, after "0.75 x 20" insert --,--.
Col. 5, line 63, delete "the" and insert --a--.
Col. 6, line 1, delete "16'" and insert --16''--.

Signed and Sealed this

Thirteenth Day of July, 1999

Attest:

Q. TODD DICKINSON

Attesting Officer

Acting Commissioner of Patents and Trademarks